US006516917B1

(12) United States Patent
Mayer et al.

(10) Patent No.: US 6,516,917 B1
(45) Date of Patent: Feb. 11, 2003

(54) OUTRIGGER ASSEMBLY FOR A MOBILE TELESCOPIC BELT CONVEYOR

(75) Inventors: Martin G. Mayer, Racine, WI (US); Rodney D. Wurgler, York, ND (US)

(73) Assignee: Putzmeister, Inc., Sturtevant, WI (US)

( * ) Notice: Subject to any disclaimer, the term of this patent is extended or adjusted under 35 U.S.C. 154(b) by 0 days.

(21) Appl. No.: 09/474,817

(22) Filed: Dec. 29, 1999

(51) Int. Cl.[7] .................................................. B60S 9/02

(52) U.S. Cl. ........................ 182/17; 280/765.1; 212/304

(58) Field of Search ........................ 182/2.1–2.11, 62.5, 182/63.4, 69.6, 17; 212/302, 304; 280/763.1, 765.1

(56) References Cited

U.S. PATENT DOCUMENTS

| | | | | |
|---|---|---|---|---|
| 2,229,840 A | | 1/1941 | Edwards | 212/69 |
| 2,767,995 A | | 10/1956 | Stout | 280/34 |
| 3,021,016 A | * | 2/1962 | Noll | |
| 3,073,458 A | | 1/1963 | Wieschel | 212/145 |
| 3,087,627 A | * | 4/1963 | Bill | |
| 3,279,622 A | | 10/1966 | Person | 212/145 |
| 3,393,810 A | | 7/1968 | Craighead | 212/1 |
| 3,743,108 A | | 7/1973 | Visser | 212/145 |
| 3,780,877 A | | 12/1973 | Levitt | 212/8 |
| 3,791,530 A | | 2/1974 | Gorl et al. | 212/145 |
| 3,812,978 A | | 5/1974 | Roland et al. | 212/1 |
| 3,840,125 A | | 10/1974 | Cozad | 212/145 |
| 3,929,204 A | | 12/1975 | Newell | 180/9.2 |
| 4,027,801 A | | 6/1977 | Johnston et al. | 212/145 |
| 4,084,777 A | | 4/1978 | Lambert | 248/287 |
| 4,118,054 A | | 10/1978 | Vigerie | 280/765 |
| 4,219,122 A | | 8/1980 | Blatchford | 212/73 |
| 4,607,862 A | | 8/1986 | Deram et al. | 280/765.1 |
| 4,619,369 A | | 10/1986 | Mertens | 212/189 |
| 4,660,731 A | | 4/1987 | Becker | 212/175 |
| 4,949,808 A | | 8/1990 | Garnett | 182/17 |
| 5,054,812 A | | 10/1991 | Lagsdin | 280/764.1 |
| 5,383,563 A | | 1/1995 | Richtsfeld et al. | 212/189 |
| 5,638,967 A | | 6/1997 | Heckmann | 212/302 |

* cited by examiner

*Primary Examiner*—Alvin Chin-Shue
(74) *Attorney, Agent, or Firm*—Andrus, Sceales, Starke & Sawall

(57) ABSTRACT

An outrigger assembly useful for supporting and stabilizing a mobile work machine, such as a vehicle-mounted telescopic belt conveyor, while the work machine is operating. The outrigger assembly includes a stationary support housing mounted to the vehicle body and a telescoping inner housing that is movable into and out of the support housing. A leg assembly, in turn, telescopes into and out of the inner housing and includes a leg member that is pivotally mounted to a mounting beam of the leg assembly. The leg member includes a support pad that contacts the ground when the leg member is in its ground-engaging position and covers the opening to the inner housing when the leg assembly is in its fully retracted position.

20 Claims, 8 Drawing Sheets

OUTRIGGER ASSEMBLY FOR A MOBILE TELESCOPIC BELT CONVEYOR

BACKGROUND OF THE INVENTION

The present invention relates to an outrigger assembly for stabilizing a mobile work machine. More specifically, the present invention is an outrigger assembly for stabilizing a self-propelled, vehicle-mounted conveyor system used to place concrete or other materials in a desired location.

Vehicle-mounted, extendable concrete conveyor systems, such as shown in U.S. Pat. No. 4,624,357, have been in use for some time. In such vehicles, a discharge conveyor assembly includes a telescoping boom having its base end pivotally mounted to the torque tube of the vehicle chassis. The substantial amount of weight extending from the vehicle chassis necessitates the use of outriggers to stabilize the vehicle and prevent the vehicle from tilting or overturning.

The most common type of outrigger system includes a plurality of leg members that can each be extended from a stationary housing fixed to the vehicle. An example of this type of outrigger is shown in U.S. Pat. No. 4,949,808. The leg member in this outrigger includes a support pad that contacts the ground to stabilize the vehicle.

A vehicle-mounted conveyor system presents unique problems in the design of the outrigger assembly. Specifically, both the discharge conveyor assembly and the infeed conveyor assembly are rotatable about a turntable assembly mounted to the vehicle chassis. Since both the infeed conveyor assembly and the discharge conveyor assembly can rotate about the vehicle, it is possible that the conveyor assemblies could contact the outrigger assemblies mounted to the vehicle. Therefore, an important design consideration is to provide individual outrigger assemblies that are constructed to prevent both the infeed conveyor assembly and the discharge conveyor assembly from contacting the outrigger assemblies as the conveyors rotate about the vehicle chassis.

Due to the length of the extendable boom contained on the discharge conveyor, a significant amount of weight positioned away from the center of gravity of the vehicle must be supported by the vehicle chassis. Therefore, in addition to being designed to avoid contact with the conveyor assemblies, the outrigger assemblies must extend a sufficient distance from the vehicle chassis in order to provide the required stability for the vehicle.

It is an object of the present invention to provide an outrigger assembly for use with a vehicle-mounted conveyor system to provide the required stability for the vehicle while preventing possible contact between the main discharge conveyor assembly and the individual outriggers. Further, it is an object of the present invention to provide a plurality of outrigger assemblies in which each outrigger assembly is contained within the overall vehicle width when in its completely retracted position. Further, it is an object of the present invention to provide an outrigger assembly that includes a leg assembly having a support pad that seals the open interior of the support housing when the leg member is in its fully retracted position. Additionally, it is an object of the present invention to provide an outrigger assembly that include a two part telescoping assembly to increase the distance the support pads extend from the vehicle chassis while minimizing the storage area of the outrigger assembly.

SUMMARY OF THE INVENTION

The present invention is an outrigger assembly for use with a mobile work machine, such as a vehicle-mounted telescopic belt conveyor, to stabilize the machine when the machine is operating. The work machine includes a plurality of the individual outrigger assemblies to provide multiple points of stabilization for the vehicle when the extendable belt conveyor is in use.

Each outrigger assembly includes a generally hollow support housing that is securely mounted to the torque tube of the vehicle. The width of the support housing is approximately equal to the width of the vehicle. The support housing defines an open interior that receives a telescoping inner housing.

The inner housing is telescopically movable into and out of the support housing between a retracted position and an extended position. The movement of the inner housing between its extended position and its retracted position is controlled by a first drive cylinder. The cylinder body of the first drive cylinder is securely attached to the inner housing, while the end of the cylinder rod of the first drive cylinder is securely fixed to the stationary support housing. When the first drive cylinder is actuated, the movement of the cylinder rod out of the cylinder body results in the outward movement of the inner housing from within the open interior defined by the support housing. Likewise, retraction of the cylinder rod into the cylinder body of the first drive cylinder results in movement of the inner housing toward the retracted position in which the inner housing is nearly completely contained within the support housing.

The outrigger assembly further includes a leg assembly that is telescopically contained within the open interior defined by the inner housing. The leg assembly includes a leg member pivotally attached to a mounting beam. The mounting beam, in turn, is movable within the open interior of the inner housing between an extended position and a retracted position. When the mounting beam is in the fully retracted position, a support pad mounted to the leg member covers the opening to the open interior of the inner housing.

The movement of the leg assembly between the retracted position and the extended position is controlled by a second drive cylinder. The cylinder body of the second drive cylinder is coupled to the mounting beam, while the cylinder rod of the second drive cylinder is fixed at its outer end to the inner housing. When the cylinder rod is extended from the cylinder body of the second drive cylinder, the mounting beam, and thus the entire leg assembly, moves from the retracted position to the extended position. In the extended position, the leg member is positioned completely out of the inner housing.

The leg member is pivotally attached to the mounting beam about a pivot rod passing through the inner end of the support leg. A pivot cylinder is positioned between an upper portion of the inner end of the leg member and the mounting beam. Specifically, one end of the pivot cylinder is securely fixed to the mounting beam, while the cylinder rod of the pivot cylinder is attached to an attachment pin passing through the inner end of the support leg. The attachment pin securing the cylinder rod of the pivot cylinder to the leg member is positioned above the pivot rod connecting the leg member to the mounting beam. In this manner, when the pivot cylinder is actuated, the movement of the cylinder rod out of the cylinder body results in downward movement of the leg member from the extended position to a ground-engaging position.

As the leg member moves to the ground-engaging position, the support pad mounted to the outer end of the leg member contacts the ground to stabilize the work machine. Further extension of the cylinder rod of the pivot cylinder results in the lifting of the vehicle body off of the ground to further stabilize the machine during operation. An advantage of the outrigger assembly of the present invention is that it is compact in size when in the retraction position yet extends far enough from the vehicle body to provide the required stabilization for a large telescoping boom conveyor system. Further, the leg member of each outrigger assembly is angled from the extended inner housing to allow the telescoping boom of a mobile conveyor system to be rotated around the vehicle without the possibility of contact with any portion of the outrigger assemblies.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawing.

DETAILED DESCRIPTION OF THE INVENTION

Figure 1:
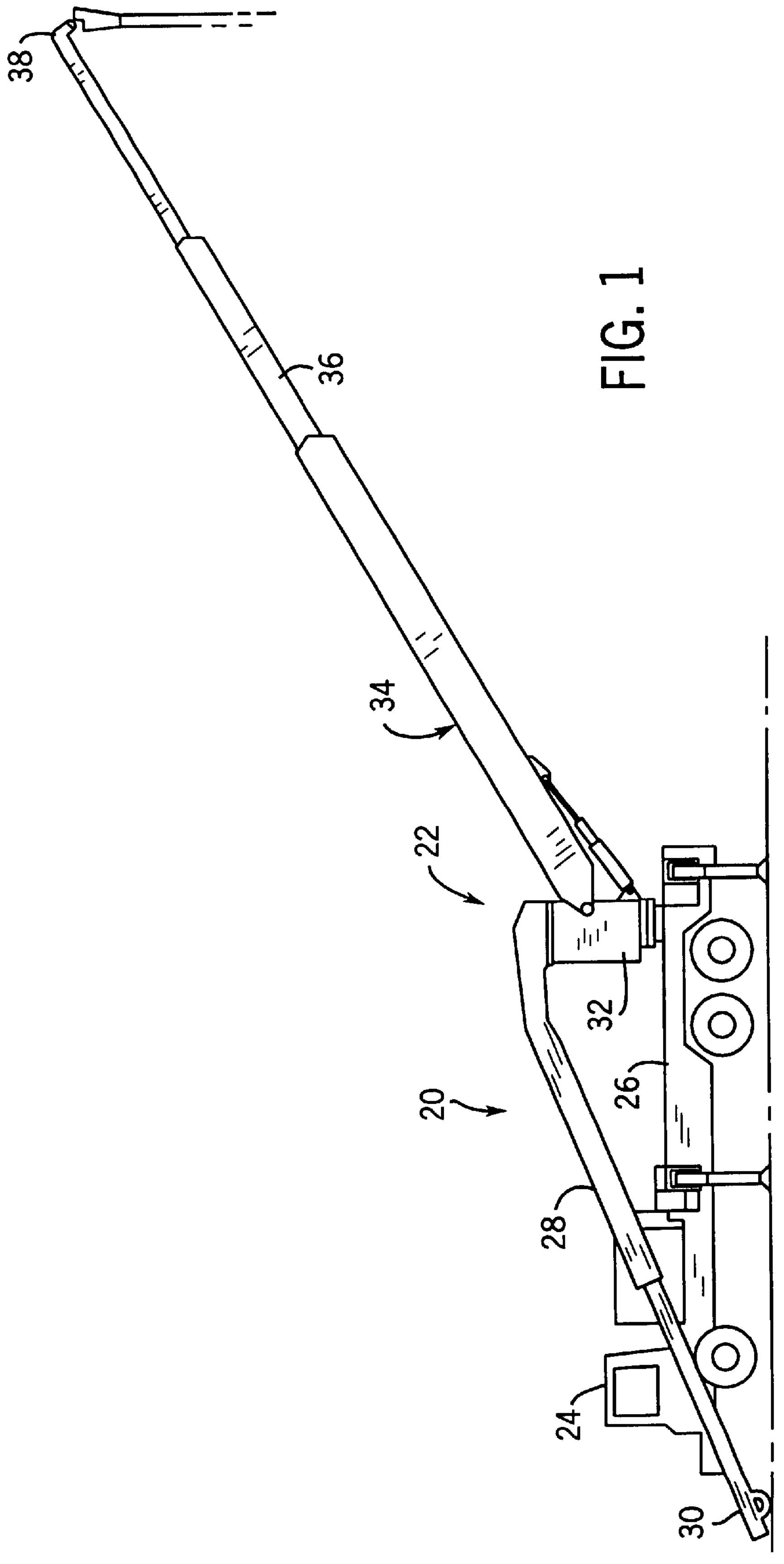
FIG. 1 is a side elevation view of a self-propelled vehicle including a vehicle-mounted conveyor system and a plurality of outrigger assemblies constructed in accordance with the present invention.
Figure 2:
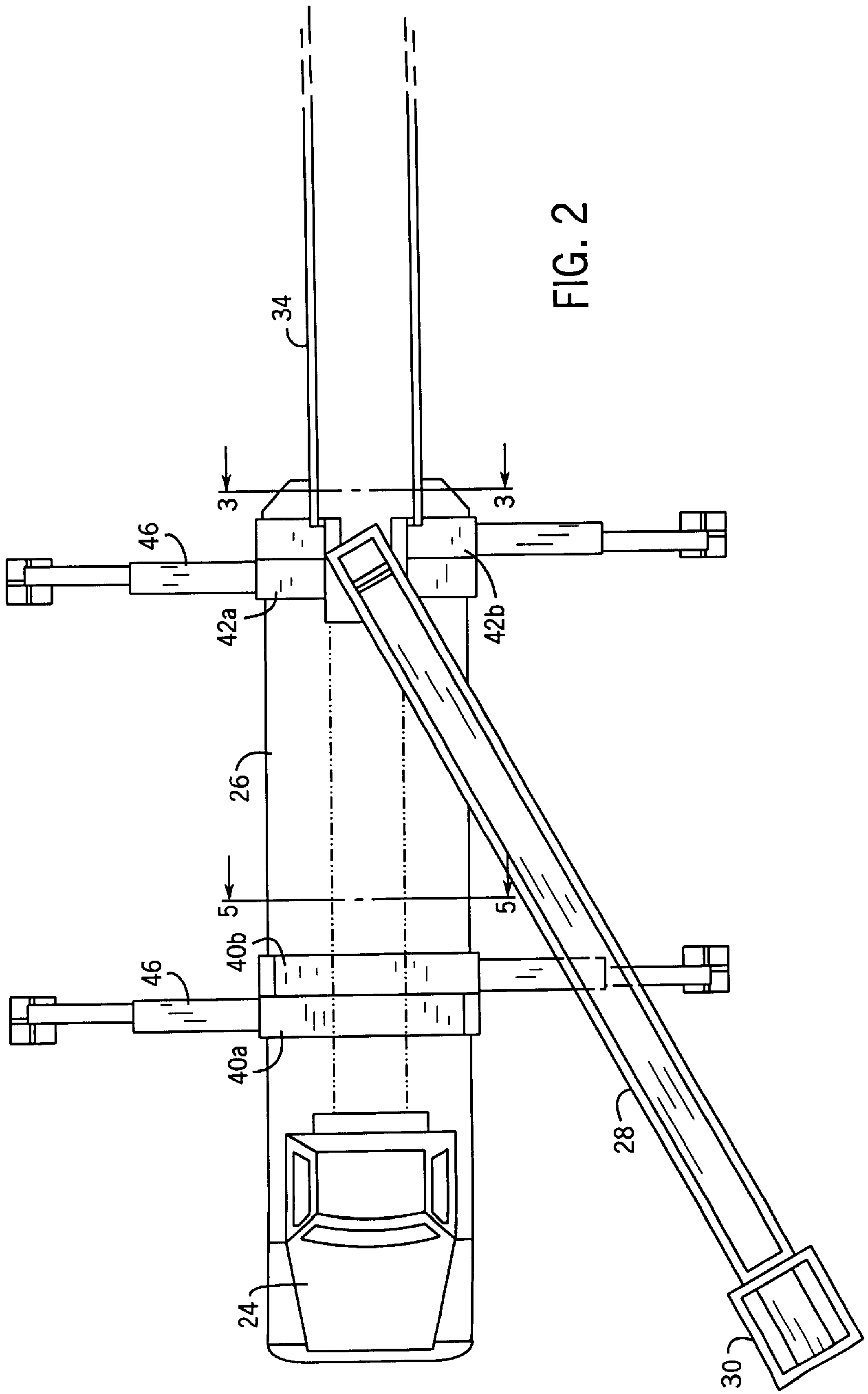
FIG. 2 is a top plan view of the vehicle illustrating the outrigger assemblies of the present invention in their fully extended, ground-engaging position.

A mobile work machine, such as the self-propelled vehicle 20 including a vehicle-mounted conveyor system 22 for transporting an aggregate material such as concrete is best shown in FIGS. 1 and 2. The vehicle 20 includes a conventional cab 24 and a torque tube 26. The vehicle 20 is of a size and weight such that it does not exceed the legal dimensional limits for over the highway travel.

The conveyor system 22 includes an infeed conveyor assembly 28 that receives the supply of aggregate material, such as concrete, from a supply source 30 and transports the material upward along a moving infeed conveyor belt. The infeed conveyor assembly 28 is rotatable about the vehicle 20 such that the infeed conveyor assembly 28 can receive the supply of material at various locations around the vehicle 20.

The conveyor system 22 includes a main turret 32 that is rotatably mounted to the torque tube 26 of the vehicle 20 by a rotatable turntable. A discharge conveyor assembly 34 is pivotally mounted to the main turret 32 about a horizontal pivot axis and also rotates along with the main turret 32. Specifically, the discharge conveyor assembly 34 includes a telescoping boom 36 having its base end mounted in a cantilever manner to the main turret 32. The discharge end 38 of the discharge conveyor assembly 34 is extendable away from the main turret 32 to control placement of the conveyed aggregate from the discharge end 38.

As can be seen in FIG. 2, the vehicle 20 includes a pair of front outrigger assemblies 40*a* and 40*b* and a pair of rear outrigger assemblies 42*a* and 42*b*. Each of the outrigger assemblies extends from the torque tube 26 in a direction transverse to the longitudinal axis of the vehicle 20. The outrigger assemblies are operable to elevate the vehicle 20 above the work surface and stabilize the vehicle to allow the discharge conveyor assembly 34 to be extended in the manner shown in FIG. 1. In general, each of the outrigger assemblies 40*a*, 40*b*, 42*a* and 42*b* includes identical operating components and function in an identical manner such that the single description of the outrigger assembly below is applicable to each of the outrigger assemblies. The four individual outrigger assemblies shown in FIGS. 1 and 2 provide the required stabilization for the vehicle 20 during operation of the telescoping boom 36.

Figure 3:
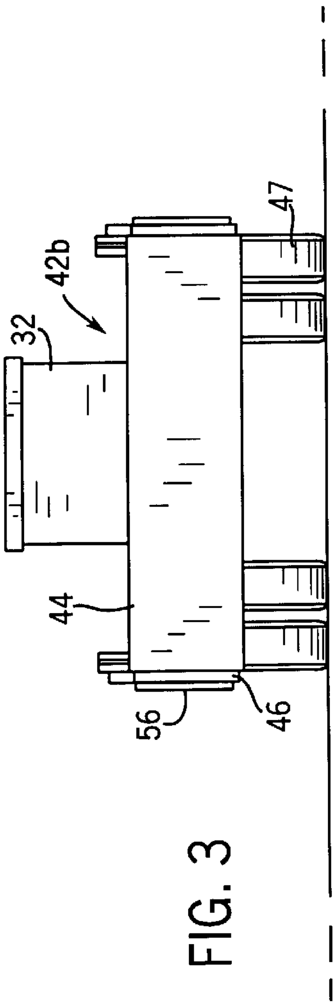
FIG. 3 is a rear view of the vehicle with the rear outrigger assemblies in their fully retracted position.

FIG. 3 illustrates the rear outrigger assembly 42*b* in its fully retracted position. The outrigger assembly 42*b* includes a stationary support housing 44 that is securely mounted to the vehicle chassis and is positioned behind the rear wheels 47 of the vehicle 20.

Figure 5:
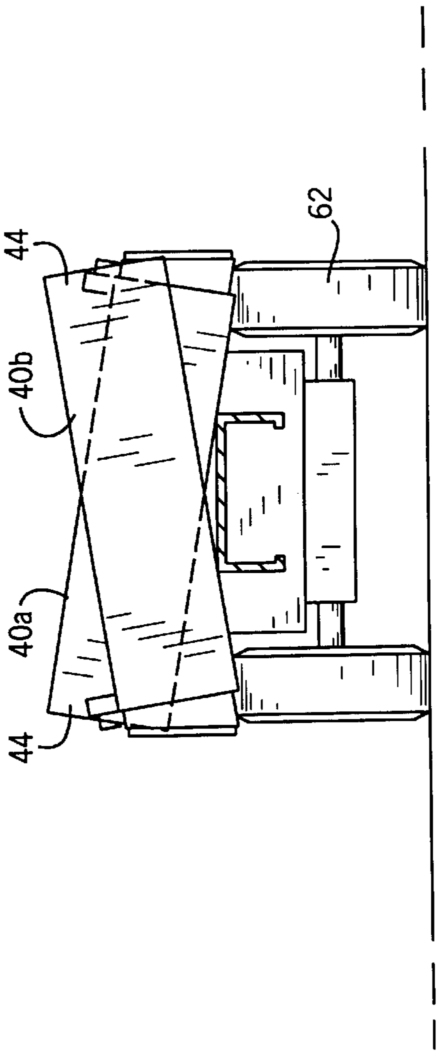
FIG. 5 is a rear view taken along line 5—5 of FIG. 2 illustrating a pair of front outrigger assemblies in their fully retracted position.

FIG. 5 illustrates both of the front outrigger assemblies 40*a* and 40*b* in their fully retracted positions. Each of the front outrigger assemblies 40*a* and 40*b* also includes a stationary support housing 44 mounted to the vehicle chassis. As illustrated in FIG. 5, both of the front outrigger assemblies 40*a* and 40*b* are mounted at an angle relative to horizontal. The angled mounting of the front outrigger assemblies 40*a* and 40*b* relative to the vehicle chassis compensates for the increased elevation of the front outrigger assemblies 40*a* and 40*b* relative to the rear outrigger assemblies 42*a* and 42*b*. In this manner, identical outrigger assemblies can be utilized for both the front pair of outrigger assemblies and the rear pair of outrigger assemblies.

Figure 4:
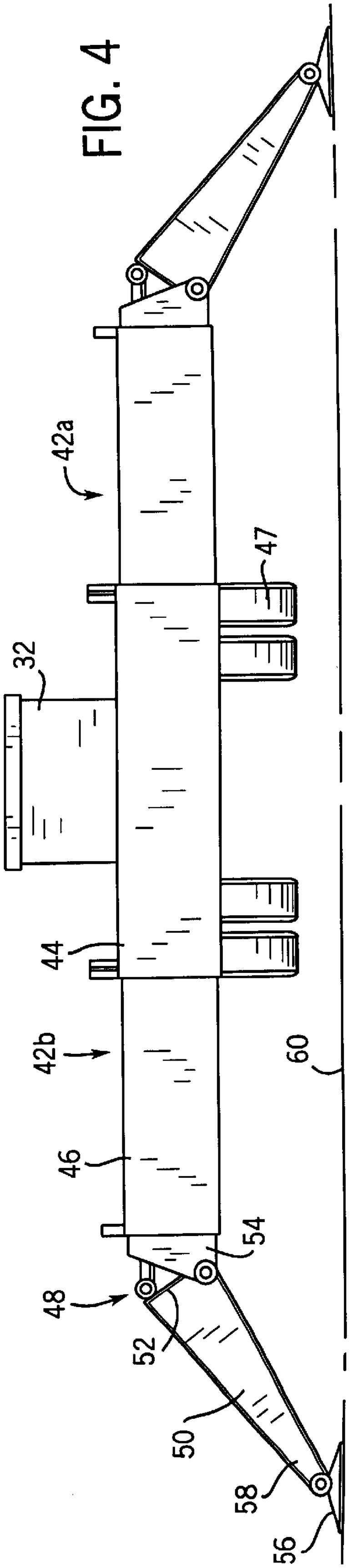
FIG. 4 is a rear view similar to FIG. 3 illustrating the outrigger assemblies in their fully extended position.

The rear outrigger assembly 42*b* is shown in FIG. 4 in its fully extended, ground-engaging position. When in the fully extended position, an inner housing 46 extends from the support housing 44. Additionally, a leg assembly 48 extends from the inner housing 46. The leg assembly 48 includes a leg member 50 having its inner end 52 pivotally connected to a mounting beam 54 that is telescopingly movable within the inner housing 46. A support pad 56 is pivotally mounted to an outer end 58 of the leg member 50. The support pad 56 contacts the ground 60 when the outrigger assembly 42*b* is in its fully extended, ground-engaging position. In addition to the rear outrigger assembly 42*b*, FIG. 4 also illustrates the rear outrigger assembly 42*a* in its fully extended position. The combination of the pair of fully extended rear outrigger assemblies 42*a* and 42*b* elevate the rear wheels 47 of the vehicle 20 above the ground 60, as can be clearly seen in FIG. 4.

Figure 6:
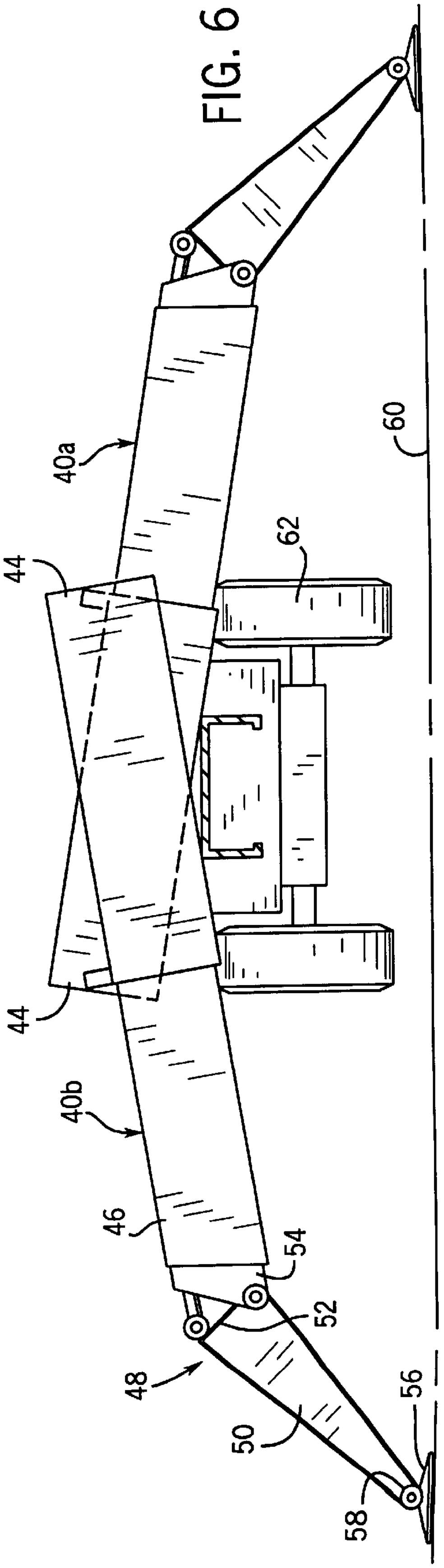
FIG. 6 is a view similar to FIG. 5 illustrating the front outrigger assemblies in their fully extended position.

Referring now to FIG. 6, thereshown are each of the front outrigger assemblies 40*a* and 40*b* in their fully extended position. As was previously discussed, all four of the outrigger assemblies mounted to the vehicle 20 include identical operating components, such that corresponding reference numerals are utilized to facilitate understanding. As can be understood in FIG. 6, when both of the front outrigger assemblies 40*a* and 40*b* are in their fully extended position, the front wheels 62 of the vehicle 20 are elevated above the ground 60. In this manner, the combination of the four individual outrigger assemblies stabilize the vehicle 20, which allows the telescoping boom 36 to be extended as shown in FIG. 1.

Referring back to FIG. 3, when each of the rear outrigger assemblies 42*a* and 42*b* are in their fully retracted position, the overall width of the pair of outrigger assemblies is approximately equal to the width of the vehicle as generally defined by the rear axle extending between the rear wheels 47. Thus, the combination of the pair of rear outrigger assemblies does not increase the overall width of the vehicle 20.

Figure 7:
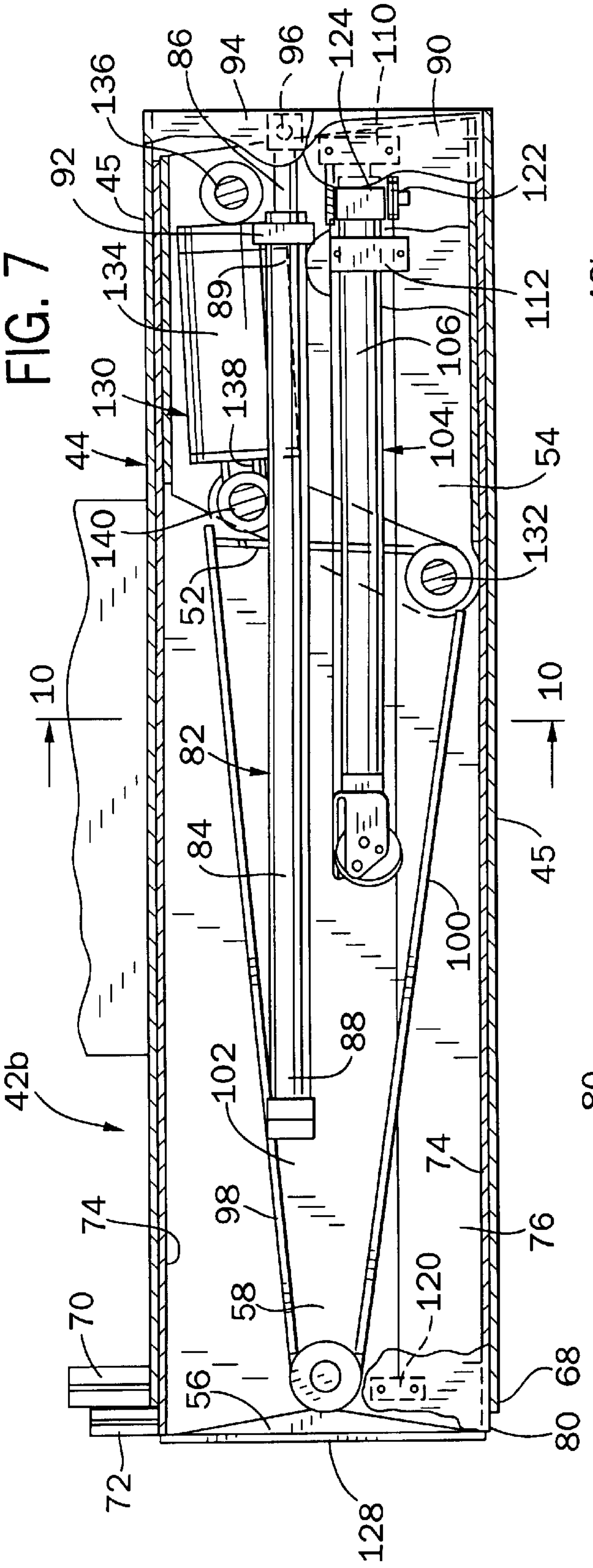
FIG. 7 is a section view of one of the rear outrigger assemblies in its fully retracted position.
Figure 8:
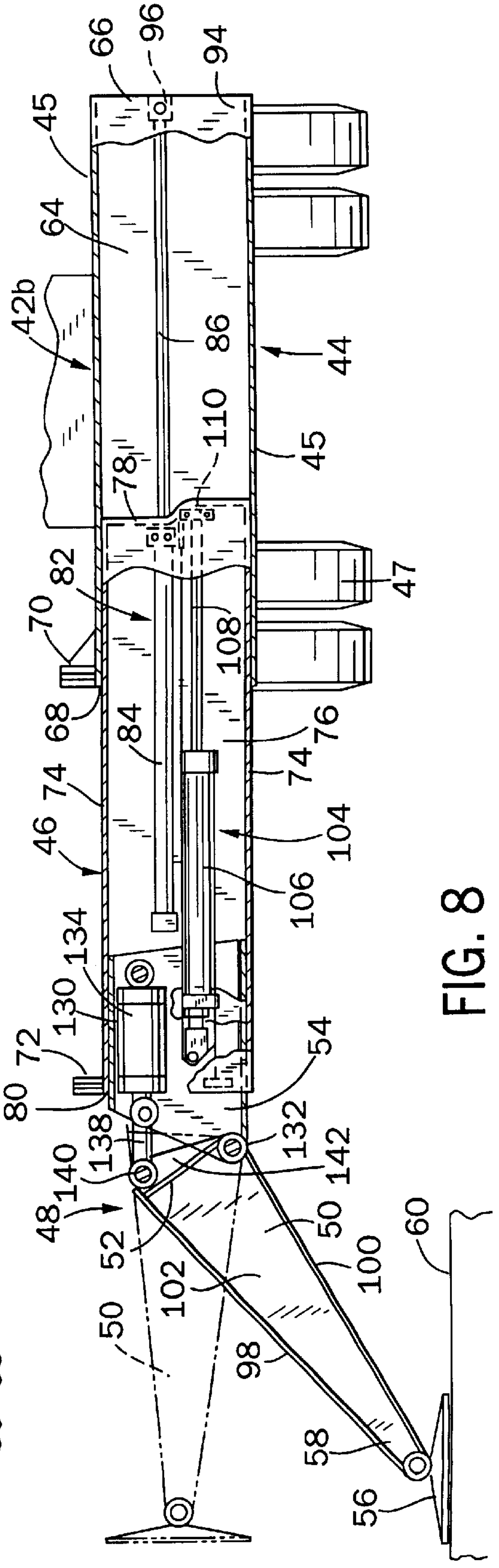
FIG. 8 is a section view illustrating the rear outrigger assembly shown in FIG. 7 in its fully extended, ground-engaging position.

FIGS. 7 and 8 illustrate the detailed construction of the rear outrigger assembly 42*b*, although the following description is equally applicable to each of the outrigger assemblies. As previously discussed, the outrigger assembly 42*b* includes the stationary support housing 44 securely connected to the chassis of the vehicle 20. The support housing 44 is formed from a generally rectangular outer shell 45 constructed from a metallic material, such as steel. In the preferred embodiment of the invention, the support housing 44 has an overall length of approximately 98 inches, which is approximately equal to the width of the vehicle chassis.

As can be seen in FIG. 8, the outer shell 45 of the support housing 44 defines a generally open interior 64 that extends between a closed back end 66 and an open front end 68. The front end 68 of the support housing 44 includes a reinforcing ridge 70 extending upward from the outer shell 45. The reinforcing ridge 70 contacts a corresponding reinforcing ridge 72 formed on an outer shell 74 that defines the inner housing 46.

As can be seen in the combined views of FIGS. 2 and 8, the inner housing 46 is also generally rectangular and defines an open interior 76 extending between an open back end 78 and an open front end 80. As can be understood in FIGS. 7 and 8, the inner housing 46 is extendable into and out of the open interior 64 defined by the support housing 44. Specifically, the inner housing 46 is movable between a retracted position in which nearly the entire inner housing 46 is contained within the support housing 44, as shown in FIG. 7, and an extended position in which a substantial portion of the inner housing 46 extends from the support housing 44, as shown in FIG. 8.

Figure 10B:
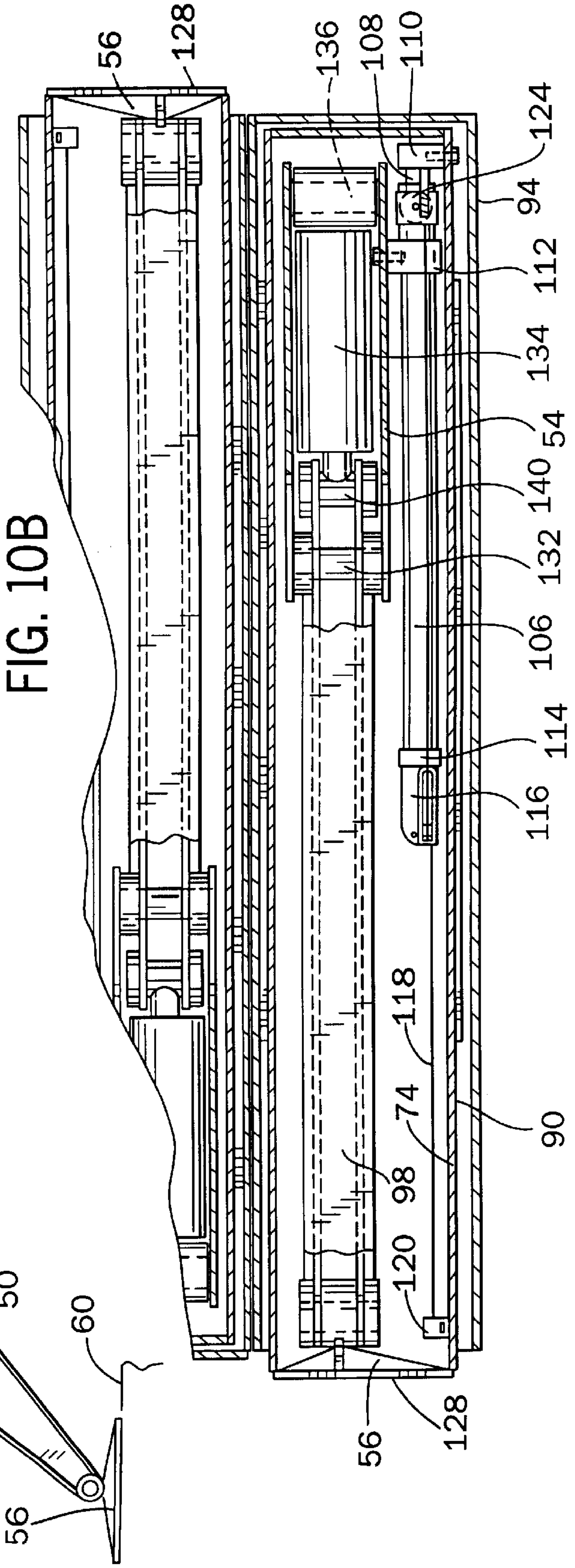
FIG. 10*b* is a partial section view taken along line 10*b*—10*b* of FIG. 10 illustrating the pair of rear outrigger assemblies in their fully retracted position.

In the preferred embodiment of the invention, the means for moving of the inner housing 46 into and out of the support housing 44 is a first drive cylinder 82. The first drive cylinder 82 is a fluid-actuated cylinder having a cylinder body 84 and an extendable cylinder rod 86. Referring now to FIGS. 7 and 10*a*, the cylinder body 84 is contained in the open interior 76 defined by the outer shell 74 of the inner housing 46 and extends between a first end 88 and a second end 89. The second end 89 of the cylinder body 84 is securely connected to the inner surface of the sidewall 90 of the inner housing 46. Specifically, a mounting block 92, including a pair of attachment means, secures the second end 89 of the cylinder body 84 to the sidewall 90. In this manner, the cylinder body 84 is securely attached to the inner housing 46.

The end of the cylinder rod 86 is securely attached to sidewall 94 of the outer shell 45 defining the stationary support housing 44 by a mounting block 96. The mounting block 96 secures the cylinder rod 86 to the stationary support housing 44. As can be understood in FIGS. 7 and 8, when the first drive cylinder 82 is actuated, the cylinder rod 86 is forced out of the cylinder body 84, causing the inner housing 46 secured to the second end 89 of the cylinder body 84 to move outward. The inner housing 46 continues to move outward relative to the stationary support housing 44 until the cylinder rod 86 is completely extended, as illustrated in FIG. 8. When the cylinder rod 86 is fully extended, the inner housing 46 is in its completely extended position.

In the preferred embodiment of the invention, the first drive cylinder 82 is a two-directional fluid-actuated cylinder such that the first drive cylinder 82 can be operated in a reverse direction to retract the cylinder rod 86 into the cylinder body 84 and move the inner housing 46 from the fully extended position shown in FIG. 8 to the retracted position shown in FIG. 7.

Figure 10:
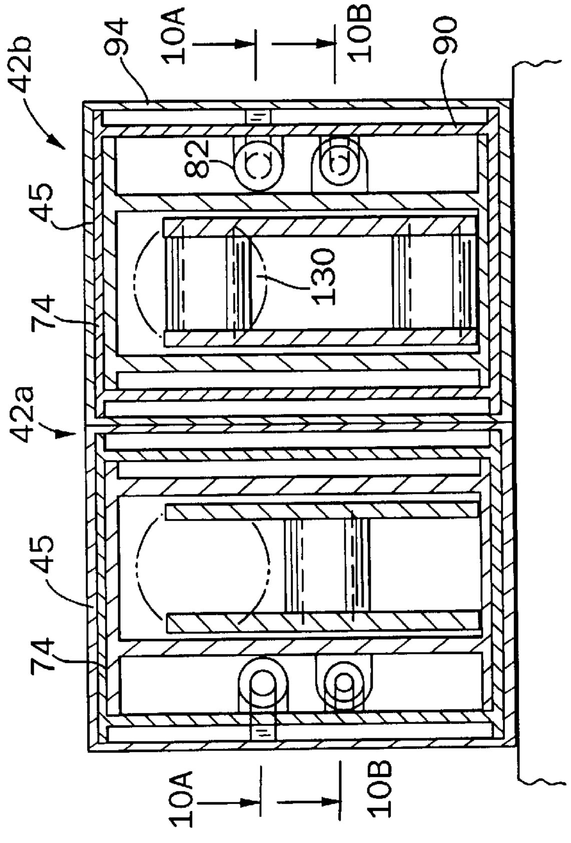
FIG. 10 is a section view taken along line 10—10 of FIG. 7 illustrating the pair of rear outrigger assemblies in their fully retracted position.
Figure 10A:
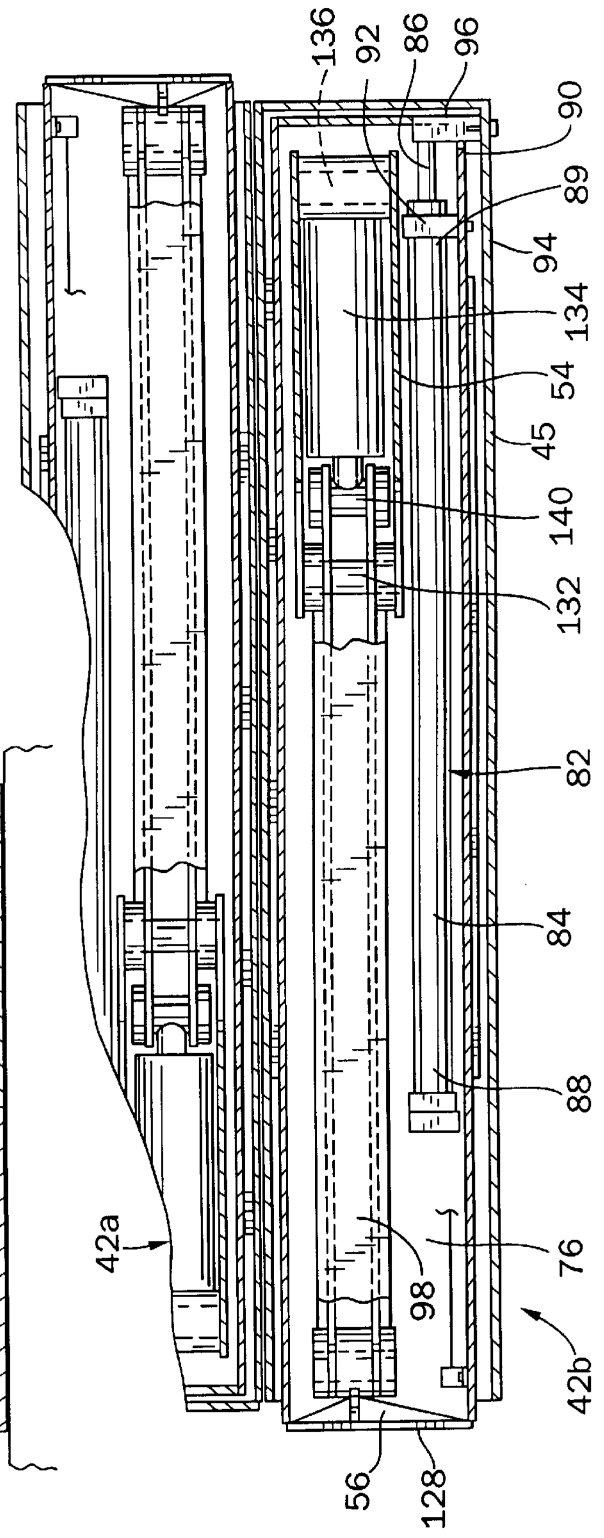
FIG. 10*a* is a section view taken along line 10*a*—10*a* of FIG. 10 illustrating the pair of rear outrigger assemblies in their fully retracted position.

Referring now to FIGS. 10 and 10*a*, in the preferred embodiment of the invention the first drive cylinder 82 is positioned inside the outer shell 74 of the inner housing 46. Thus, when the inner housing 46 is in its extended position, the first drive cylinder 82 is concealed within the inner housing 46, as can be seen in FIG. 4.

The leg assembly 48 is shown in its completely retracted position in FIG. 7 and in its extended position, in phantom, in FIG. 8. The leg assembly 48, and specifically the leg member 50, is movable from the extended position, shown in phantom in FIG. 8, to the ground-engaging position in which the support pad 56 contacts the ground 60. The leg member 50 extends between the outer end 58 and the inner end 52. The leg member 50 is generally tapered from the inner end 52 to the outer end 58 and includes a top wall 98 and a bottom wall 100 that are joined by opposed side plates 102. The cross-section of the leg member 50 has a generally rectangular profile with the top wall 98 and the bottom wall 100 tapering towards each other from the inner end 52 to the outer end 58.

As can be understood in FIGS. 7 and 8, the leg member 50 is pivotably connected to the mounting beam 54. The mounting beam 54 is movable into and out of the open interior 76 of the inner housing 46. Specifically, mounting beam 54 is movable between a retracted position shown in FIG. 7 and an extended position shown in FIG. 8.

In the preferred embodiment of the invention, the means for moving the leg member 50 into and out of the inner housing 46 is a second drive cylinder 104. The second drive cylinder 104 includes a cylinder body 106 and an extendable cylinder rod 108. As can be seen in FIGS. 7 and 10*b*, the second drive cylinder 104 is positioned within the outer shell 74 of inner housing 46 and is positioned beneath the first drive cylinder 82. The cylinder rod 108 of the second drive cylinder 104 is fixed to the sidewall 90 of the inner housing 46 by a mounting block 110. In this manner, the end of the cylinder rod 108 is fixed to the inner housing 46 such that when the second drive cylinder 104 is actuated, the cylinder body 106 moves away from the mounting block 110.

Figures 11A, 11B:
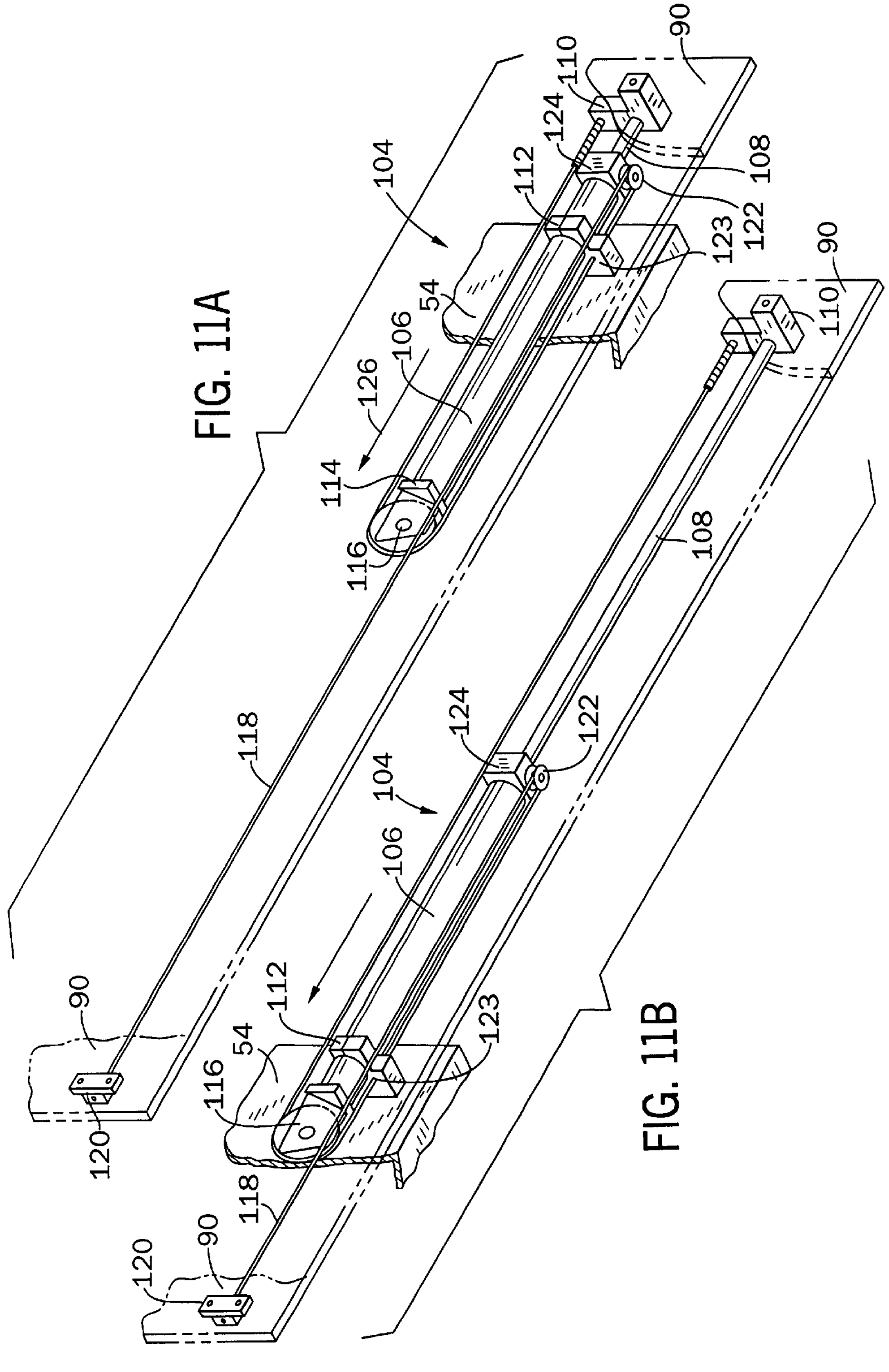
FIGS. 11*a* and 11*b* illustrate the driving movement of the second drive cylinder that is operable to move the leg assembly between the retracted position and the extended position.

Referring now to FIGS. 11*a* and 11*b*, thereshown is the specific embodiment of the second drive cylinder 104 utilized to move the leg assembly 48 between its retracted and extended positions. The cylinder body 106 of the second drive cylinder 104 is journaled within a guide block 112, which in turn is securely fixed to the mounting beam 54. The outer end 114 of the cylinder body 106 includes a sheave assembly 116. A fixed length cable 118 has its first end secured to the sidewall 90 of the inner housing 46 by an attachment block 120. The fixed length cable 118 extends from the attachment block 120 and passes around a sheave 122 mounted to the inner end 124 of the cylinder body 106. The cable 118 extends from the sheave 122 to guide block 112 where the cable is secured to the guide block 112. The cable 118 then passes around the sheave assembly 116 fixed to the outer end 114 of the cylinder body 106 and has its second end fixed to the mounting block 110.

When the second drive cylinder 104 is actuated from the retracted position shown in FIG. 11*a*, the cylinder rod 108 extends from the cylinder body 106 which causes the cylinder body 106 to move in the direction illustrated by arrow 126. As the cylinder rod 108 continues to be forced from the cylinder body 106 to its fully extended position, the fixed length cable 118, as it goes around the sheave assembly 116 and is attached to the guide block 112, which causes the mounting beam 54 to be extended out of the inner housing 46, as can be illustrated in FIGS. 11*a* and 11*b*. The cylinder body 106 moves through the guide block 112 until cylinder 104 reaches its fully extended position As with the first drive cylinder 82 discussed previously, the second drive cylinder 104 is a two-directional, fluid-actuated cylinder, such that when the leg assembly 48 needs to be retracted, the second drive cylinder 108 is actuated in the reverse direction to retract the cylinder rod 108 into the cylinder body 106.

Referring back to FIG. 7, when the leg assembly 48 is in its fully retracted position as shown, the support pad 56 pivots about the outer end 58 of the leg member 50 and the bottom surface 128 of the support pad 56 covers the open front end 80 of the inner housing 46. Thus, when the outrigger assembly 42*b* is in its fully retracted position, the bottom surface 128 of the support pad 56 closes the open interior 76 containing the leg assembly 48.

When the second drive cylinder 104 is actuated, the mounting beam 54 is driven out of the inner housing 46 to its fully extended position, shown in phantom in FIG. 8. Initially, when the mounting beam 54 is driven to its fully extended position, the leg member 50 is generally aligned along the longitudinal axis of the outrigger assembly. As can be seen in phantom in FIG. 9, the extended leg member 50 is aligned along the longitudinal axis of the outrigger assembly 40*b* even though the front outrigger assembly 40*b* is mounted at an angle relative to horizontal.

Referring back to FIGS. 7 and 8, once the leg assembly 48 has been moved to its fully extended position, as shown in phantom in FIG. 8, a pivot cylinder 130 is actuated to rotate the leg member 50 about a pivot rod 132 that joins the inner end 52 of the leg member 50 to the mounting beam 54. The pivot rod 132 passes through aligned openings in the leg member 50 and the mounting beam 54 to allow the leg member 50 to pivot relative to the mounting beam 54.

The pivot cylinder 130 includes cylinder body 134 securely mounted to the mounting beam 54 by an attachment pin 136. The pivot cylinder 130 includes a cylinder rod 138 that is extendable from the cylinder body 134. The cylinder rod 138 has its end rotatably coupled to the inner end 52 of the leg member 50 by a second attachment pin 140 that passes through both the leg member 50 and the cylinder rod 138. As can be understood in FIGS. 7 and 8, the attachment pin 140 passes through an extended flange 142 formed on the inner end 52 of the leg member 50. The attachment pin 140 is positioned above and slightly behind the pivot pin 132 such that when the cylinder rod 138 is extended from the cylinder body 134 of the pivot cylinder 130, the leg member 50 rotates downward about the pivot rod 132 to a ground-engaging position in which the support pad 56 contacts the ground 60. Further outward movement of the cylinder rod 138 causes the leg member 50 to continue to rotate downward, which lifts the rear tires 47 of the vehicle 20 off the ground, as illustrated in FIG. 4.

Figure 9:
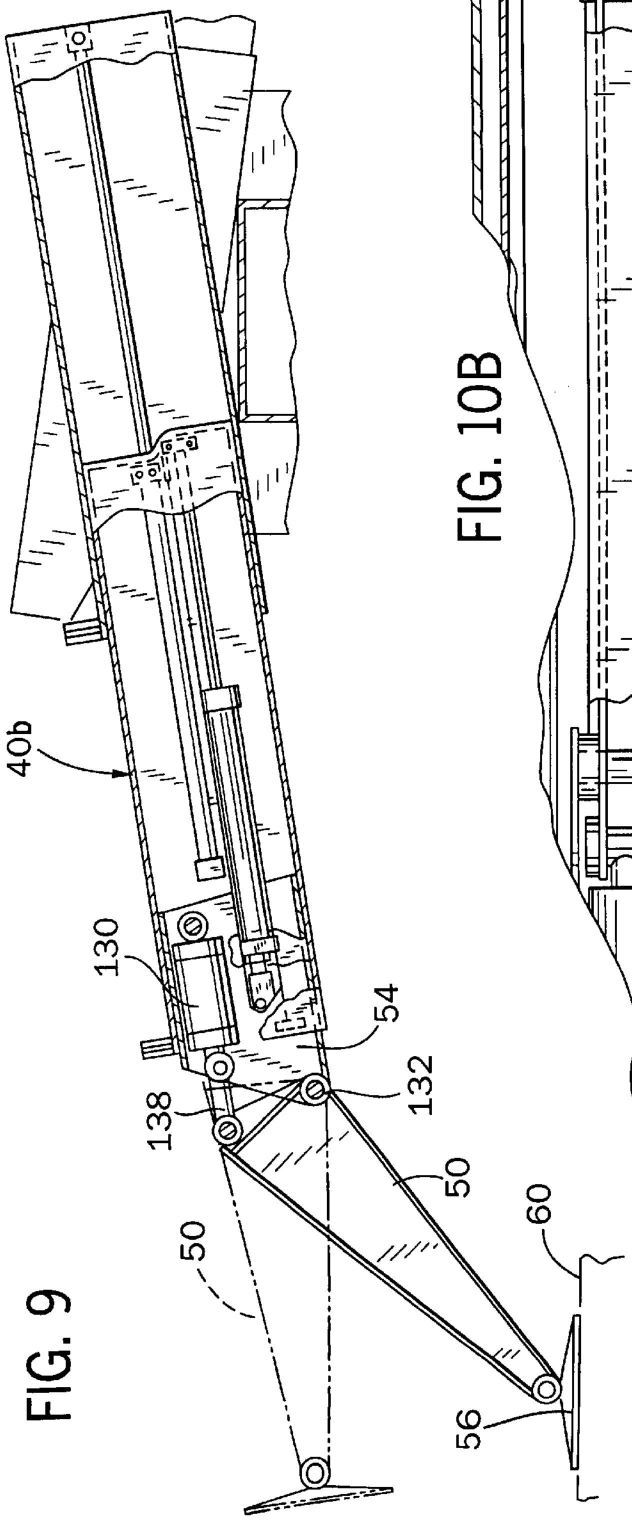
FIG. 9 is a partial section view of one of the front outrigger assemblies in its fully extended, ground-engaging position.

Referring now to FIG. 9, the operation of the pivot cylinder 130 of the front outrigger assembly 40*b* to rotate the leg member 50 about a pivot pin 132 is identical to the manner of operation described in connection with the rear outrigger assembly 42*b*. The pivoting connection between the support pad 56 and the leg member 50 allows the support pad 56 to evenly contact the ground 60 as the leg member 50 is rotated into its ground-engaging position as shown.

The pivot cylinder 130 is a two-directional, fluid-actuated cylinder that can be operated in the reverse direction to move the leg member 50 from the ground-engaging position back to the extended position.

The sequence of operation in moving the outrigger assembly from the retracted position shown in FIG. 7 to the fully extended, ground-engaging position illustrated in FIG. 8 is as follows. Initially, the second drive cylinder 104 is actuated to extend the cylinder rod 108. Extension of the cylinder rod 108 causes the mounting beam 54 to move out of the inner housing 46 to its extended position. Once the mounting beam 54 is in its extended position, the first drive cylinder 82 is actuated. Actuation of the first drive cylinder 82 moves the inner housing 46 out of the support housing 44 to its extended position.

After the mounting beam 54 has been moved to its extended position, the pivot cylinder 130 can be actuated to extend the pivot rod 138. Extension of the pivot rod 138 causes the leg member 50 to rotate downward into the ground-engaging position at which time the support pad 56 contacts the ground. Further extension of the pivot rod 138 causes the rear wheels 47 of the vehicle 20 to elevate above the ground such that the outrigger assemblies stabilize the vehicle as desired.

The operational sequence to move each of the outrigger assemblies from the fully extended, ground-engaging position to the retracted position of FIG. 7 is the reverse of the sequence set out above. Initially, the cylinder rod 138 of the pivot cylinder 130 is retracted to move the leg member 50 vertically upward from the ground-engaging position to its extended position shown in phantom in FIG. 8. After the leg member 50 has been moved to its extended position, the cylinder rod 86 of the first drive cylinder 82 is retracted to move the inner housing 46 into the support housing 44. The cylinder rod 86 continues to be retracted and the inner housing 46 continues to move inward until the cylinder rod 86 reaches its completely retracted position.

Following the complete retraction of the inner housing 46, the cylinder rod 108 of the second drive cylinder 104 is retracted to move the mounting beam 54 inward within the inner housing 46. When the leg assembly 48 has been completely retracted, the support pad 56 closes the open outer end 80 of the inner housing 46.

Although the first drive cylinder 82, the second drive cylinder 104 and the pivot cylinder 130 are shown and described as being fluid-driven cylinders, it is contemplated by the inventors that each of these cylinders could be replaced by an equivalent means for driving the inner housing 46, the leg assembly 48, and the leg member 50 between their extended and retracted positions. For example, it is contemplated by the inventors that a rotating screw drive mechanism or other equivalent structure could replace the fluid-driven cylinders shown.

Various alternatives and embodiments are contemplated as being within the scope of the following claims particularly pointing out and distinctly claiming the subject matter regarded as the invention.

We claim:

1. An outrigger assembly for stabilizing a mobile work machine, comprising:

a stationary support housing mountable to the work machine;

an inner housing telescopically positioned within the support housing;

a first drive cylinder operatively positioned between the support housing and the inner housing, the first drive cylinder being operable to move the inner housing between a retracted position in which the inner housing is positioned within the support housing and an extended position in which the inner housing extends from the support housing;

a leg assembly telescopingly positioned within the inner housing;

a second drive cylinder operatively positioned between the leg assembly and the inner housing, the second drive cylinder being operable to move the leg assembly between a retracted position in which the leg assembly is contained within the inner housing and an extended position in which the leg assembly extends out of the inner housing; and a pivot cylinder operatively connected to the leg assembly to pivot the leg assembly between the extended position and a ground engaging position;

wherein the first drive cylinder, the second drive cylinder and the pivot cylinder are independently operable such that the leg assembly can be moved to the extended position and the leg assembly can be moved to the ground-engaging position while the inner housing is in the retracted position.

2. The outrigger assembly of claim 1 wherein the leg assembly comprises:

a mounting beam connected to the second drive cylinder and telescopically movable within the inner housing to move the leg assembly between the retracted position and the extended position;

a leg member extending between an outer end and an inner end, the inner end of the leg member being pivotally mounted to the mounting beam; and wherein the pivot cylinder is positioned between the mounting beam and the inner end of the leg member, the pivot cylinder being operable to pivot the leg member between the extended position and the ground-engaging position.

3. The outrigger assembly of claim 2 wherein the leg assembly further includes a support pad pivotally mounted to the outer end of the leg member, wherein the support pad contacts the ground when the leg member is moved to its ground-engaging position.

4. The outrigger assembly of claim 3 wherein the support pad closes the open interior of the inner housing when the leg assembly is in its retracted position.

5. The outrigger assembly of claim 2 wherein the leg member is pivotally connected to the mounting beam by a pivot rod positioned below the connection between the pivot cylinder and the leg member.

6. The outrigger assembly of claim 2 wherein the pivot cylinder includes a cylinder body secured to the mounting beam and an extendable cylinder rod secured to the inner end of the leg member such that when the cylinder rod is extended from the cylinder body, the leg member rotates from the extended position to the ground-engaging position.

7. The outrigger assembly of claim 2 wherein when the leg assembly is in the retracted position, the leg assembly is contained within both the inner housing and the support housing.

8. The outrigger assembly of claim 1 wherein the first drive cylinder moves the inner housing in a direction parallel to the movement of the leg assembly by the second drive cylinder.

9. The outrigger assembly of claim 1 wherein the first drive cylinder includes a cylinder body secured to an outer shell of the inner support housing and an extendable cylinder rod secured to the outer shell of the stationary support housing such that when the cylinder rod is extended from the cylinder body, the inner housing moves from the retracted position to the extended position.

10. The outrigger assembly of claim 9 wherein the second drive cylinder includes a cylinder body coupled to the leg assembly and an extendable cylinder rod secured to the inner support housing such that when the cylinder rod is extended from the cylinder body, the leg assembly moves from the retracted position to the extended position.

11. The outrigger assembly of claim 10 wherein the cylinder body of the second drive cylinder is slidably supported within a guide block attached to the mounting beam.

12. The outrigger assembly of claim 1 wherein the leg assembly comprises:

a mounting beam connected to the guide block of the second drive cylinder and telescopically movable within the inner housing to move the leg assembly between the retracted position and the extended position;

a leg member extending between an outer end and an inner end, the inner end of the leg member being pivotally mounted to the mounting beam; and a pivot cylinder positioned between the mounting beam and the inner end of the leg member, the pivot cylinder being operable to pivot the leg member between the extended position and a ground-engaging position.

13. The outrigger assembly of claim 12 wherein the leg member is pivotally connected to the mounting beam by a pivot rod positioned below the connection between the pivot cylinder and the leg member.

14. The outrigger assembly of claim 12 wherein the pivot cylinder includes a cylinder body secured to the mounting beam and an extendable cylinder rod secured to the inner end of the leg member such that when the cylinder rod is extended from the cylinder body, the leg member rotates from the extended position to the ground-engaging position.

15. An outrigger assembly for stabilizing a mobile work machine, comprising:

a stationary support housing mountable to the work machine;

an inner housing telescopically positioned within the support housing;

a first drive cylinder operatively positioned between the support housing and the inner housing, the first drive cylinder being operable to move the inner housing between a retracted position in which the inner housing is positioned within the support housing and an extended position in which the inner housing extends from the support housing;

a leg assembly telescopingly positioned within the inner housing; and a second drive cylinder operatively positioned between the leg assembly and the inner housing, the second drive cylinder being operable to move the leg assembly between a retracted position in which the leg assembly is contained within the inner housing and an extended position in which the leg assembly extends out of the inner housing;

wherein the second drive cylinder includes a cylinder body and an extendable cylinder rod, the cylinder body being slidably supported within a guide block attached to the leg assembly and the cylinder rod being secured to the inner support housing, such that when the cylinder rod is extended from the cylinder body, the guide block slides along the cylinder body such that the leg assembly moves a distance equal to the combination of the length of the cylinder rod and the length of the cylinder body.

16. The outrigger assembly of claim 15 wherein the first drive cylinder includes a cylinder body secured to an outer shell of the inner support housing and an extendable cylinder rod secured to the outer shell of the stationary support housing such that when the cylinder rod is extended from the cylinder body, the inner housing moves from the retracted position to the extended position.

17. The outrigger assembly of claim 16 wherein the second drive cylinder includes a cylinder body coupled to the leg assembly and an extendable cylinder rod secured to the inner support housing such that when the cylinder rod is extended from the cylinder body, the leg assembly moves from the retracted position to the extended position.

18. The outrigger assembly of claim 17 wherein the cylinder body of the second drive cylinder is slidably supported within a guide block attached to the mounting beam.

19. An outrigger assembly for stabilizing a mobile work machine, comprising:

a stationary support housing mountable to the work machine;

an inner housing telescopically positioned within the support housing;

a first drive cylinder operatively positioned between the support housing and the inner housing, the first drive cylinder being operable to move the inner housing between a retracted position in which the inner housing is positioned within the support housing and an extended position in which the inner housing extends from the support housing;

a mounting beam telescopically movable within the inner housing between a retracted position and an extended position;

a leg member extending between an outer end and an inner end, the inner end of the leg member being pivotally mounted to the mounting beam;

a pivot cylinder positioned between the mounting beam and the inner end of the leg member, the pivot cylinder being operable to pivot the leg member between the extended position and a ground-engaging position;

a second drive cylinder operatively positioned between the mounting beam and the inner housing, the second drive cylinder being operable to move the mounting beam between a retracted position in which the leg assembly is contained within the inner housing and an extended position in which the leg assembly extends out of the inner housing;

wherein the second drive cylinder includes a cylinder body slidably supported within a guide block attached to the mounting beam, the second drive cylinder including an extendable cylinder rod secured to the inner support housing such that when the cylinder rod is extended from the cylinder body, the guide block moves along the cylinder body such that the mounting beam is movable a distance equal to the combined length of the cylinder rod and the cylinder body.

20. The outrigger assembly of claim 19 further comprising a fixed length cable having a first end attached to an outer end of the inner housing and a second end fixed to an inner end of the inner housing, wherein the fixed length cable passes around a first sheave fixed to an outer end of the second cylinder body and a second sheave assembly attached to the first end of the cylinder body, wherein the fixed length cable causes the guide block to slide along the cylinder body when the cylinder rod is extended from the cylinder body.

* * * * *

UNITED STATES PATENT AND TRADEMARK OFFICE

CERTIFICATE OF CORRECTION

PATENT NO. : 6,516,917 B1 
DATED : February 11, 2003
INVENTOR(S) : Martin G. Mayer and Rodney D. Wurgler It is certified that error appears in the above-identified patent and that said Letters Patent is hereby corrected as shown below:

Title page,
Item [56], References Cited, U.S. PATENT DOCUMENTS, please insert the following:
-- 4,067,595 01/1978 Vigerie --
Please insert the following:

-- FOREIGN PATENT DOCUMENTS

| | | |
|---|---|---|
| DE 2 354 648 | 05/1974 | Germany |
| FR 2 148 385 | 03/1973 | France |
| FR 1 465 606 | 03/1967 | France |
| FR 1 411 863 | 12/1965 | France |
| FR 1 376 550 | 02/1965 | France -- |

Signed and Sealed this

First Day of July, 2003

JAMES E. ROGAN
*Director of the United States Patent and Trademark Office*